March 25, 1930.　　　J. A. THOMPSON　　　1,752,123
ANIMAL FEEDER
Filed April 19, 1929
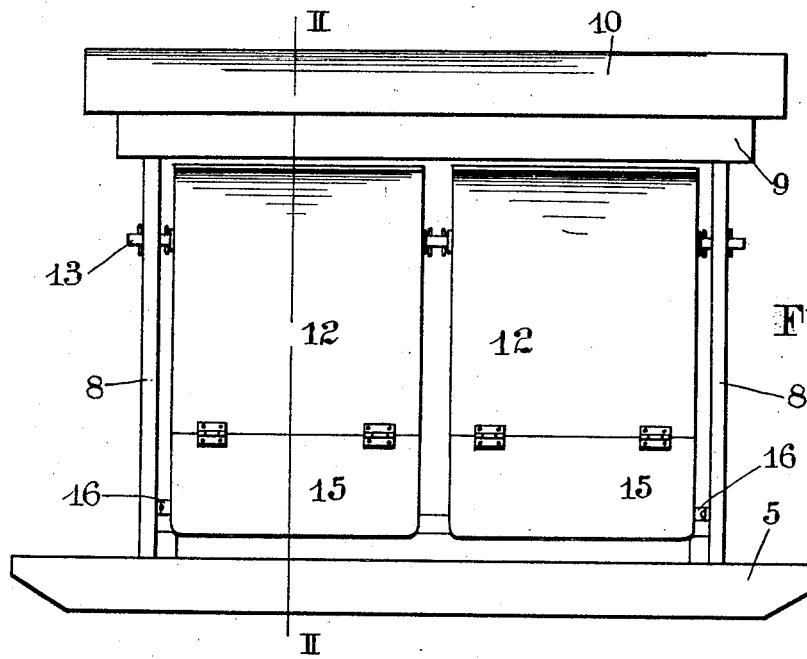
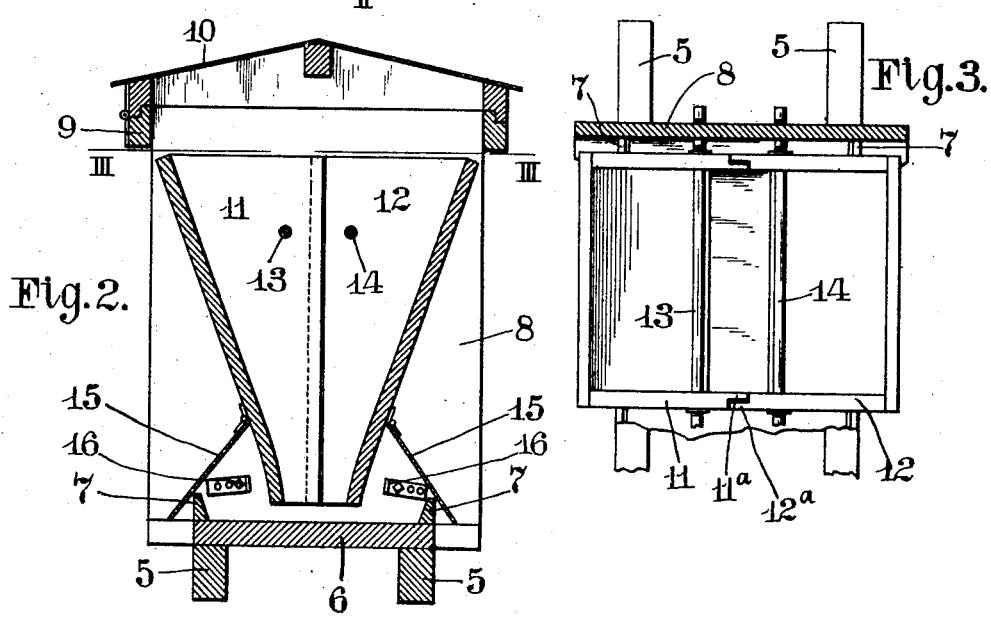
Inventor
JESS A. THOMPSON
Attorneys Patented Mar. 25, 1930

1,752,123

UNITED STATES PATENT OFFICE

JESS A. THOMPSON, OF WASHINGTON C. H., OHIO

ANIMAL FEEDER

Application filed April 19, 1929. Serial No. 356,437.

This invention relates to animal feeders and especially hog feeders.

There are at present on the market several forms of hog feeders that include a hopper discharging into a trough and means inducing the hog to cause such an agitation of the feed in the hopper as will promote its discharge to the trough where it may be taken by the hog.

The object of the present invention therefore is an improved, simplified and durable construction of feeder not likely to get out of order and whereby the cost of manufacture is reduced and which will insure a more certain discharge of the feed from the hopper to the trough.

The invention is embodied in the example herein shown and described the features of novelty being finally claimed.

In the accompanying drawing—

Figure 1 is a side view of the device according to the invention, the same being in double or twin form.

Fig. 2 is a vertical section on the line II—II Fig. 1.

Fig. 3 is a horizontal section on the line III—III Fig. 2 looking down.

In the views 5, 5, are runners or skids upon which is secured a bed 6 having parallel cleats 7, 7 forming the trough.

Erected at the ends of the bed are walls or standards 8, 8, to the upper ends of which are secured a rectangular frame 9. Hinged to one longitudinal member of said rectangular frame 9 is a hood 10 made in the form of a roof and designed to protect the contents of the hoppers from rain, snow and the like and permitting the supply of the hoppers with feed.

The hoppers are substantially alike in construction, the body portion thereof being made of wood and composed of two parts or halves 11 and 12 hung on pivoting rods or pipe 13 and 14 supported in the standards 8, 8. The halves of the hopper are complementarily rabbeted at their meeting edges as shown at $11^a$ and $12^a$, the rabbets being so formed as to make a sliding joint and to prevent their separation laterally from each other. These rabbets can be lined or braced with thin sheet metal, if desired, to make a smooth contact.

Adjustable stops 16 are provided on the standards 8 to limit the oscillations of the hopper.

When the hopper is oscillated by pressure on the lower or discharge end, as when the hog pushes said end in his endeavor to take the feed, the parts of the hopper reciprocate on each other and so promote the movement downward and discharge of the feed, as for example ears of corn. If the hopper be full this movement downward of the feed is promoted a little by the presence of the rods 13 and 14.

Each of the halves of the hopper is provided at its lower external side with a sheet metal apron 15 hinged to the half, which apron has a free space below its lower edge into which the hog can insert his snout the hog being required to raise the apron with that member before he can gain access to the feed.

The forms of the parts can be changed without departing from the gist of the invention as claimed.

What I claim is:

1. In a hog feeder including a suitable supporting frame, a hopper composed of two parts adapted to slide on each other at edges thereof and means for pivoting said parts in said frame.

2. In a hog feeder including a suitable supporting frame, a hopper composed of two parts having lapping edges and means for pivoting said parts in said frame whereby oscillation of one of said parts causes the oscillation and reciprocation of the other on the oscillated part.

3. In a hog feeder including a suitable supporting frame, a hopper composed of two parts having rabbeted lapping edges and means for pivoting said parts in said frame whereby oscillation of one of said parts causes the oscillation and reciprocation of the other on the oscillated part.

4. In a hog feeder including a suitable supporting frame, a hopper composed of two parts having lapping edges and means extending through hopper parts for pivoting said parts in said frame whereby oscillation of one of said parts causes the oscillation and reciprocation of the other on the oscillated part.

JESS A. THOMPSON.